United States Patent
Busch et al.

(10) Patent No.: US 9,011,058 B2
(45) Date of Patent: Apr. 21, 2015

(54) FASTENING ELEMENT FOR CONNECTING A SUPPORT PART TO AN ADD-ON PART

(75) Inventors: Martin Busch, Efringen-Kirchen (DE); Friedrich Silbereisen, Efringen-Kirchen (DE)

(73) Assignee: A. Raymond et Cie, Grenoble (FR)

( * ) Notice: Subject to any disclaimer, the term of this patent is extended or adjusted under 35 U.S.C. 154(b) by 624 days.

(21) Appl. No.: 12/669,367

(22) PCT Filed: Jul. 18, 2008

(86) PCT No.: PCT/EP2008/005921
§ 371 (c)(1),
(2), (4) Date: Jan. 15, 2010

(87) PCT Pub. No.: WO2009/012947
PCT Pub. Date: Jan. 29, 2009

(65) Prior Publication Data
US 2011/0020093 A1    Jan. 27, 2011

(30) Foreign Application Priority Data

Jul. 25, 2007  (DE) .......................... 10 2007 034 785

(51) Int. Cl.
*F16B 19/10*   (2006.01)
*F16B 21/08*   (2006.01)

(52) U.S. Cl.
CPC ........... *F16B 19/1081* (2013.01); *F16B 21/086* (2013.01)

(58) Field of Classification Search
USPC ............................................... 411/41, 45–48
See application file for complete search history.

(56) References Cited

U.S. PATENT DOCUMENTS

| | | | | |
|---|---|---|---|---|
| 3,595,506 A | * | 7/1971 | Saunders | 248/71 |
| 4,398,317 A | * | 8/1983 | Schubring | 16/82 |
| 4,403,377 A | * | 9/1983 | Mizusawa | 24/681 |
| 4,405,272 A | * | 9/1983 | Wollar | 411/41 |
| 5,775,860 A | * | 7/1998 | Meyer | 411/46 |
| 5,846,040 A | * | 12/1998 | Ueno | 411/45 |
| 6,196,756 B1 | * | 3/2001 | Leverger | 403/326 |
| 6,616,479 B1 | * | 9/2003 | Jones | 439/567 |
| 6,726,417 B2 | * | 4/2004 | Kanie | 411/48 |
| 6,846,313 B1 | * | 1/2005 | Rogers et al. | 606/326 |
| 6,979,162 B2 | * | 12/2005 | Kato | 411/371.1 |

(Continued)

FOREIGN PATENT DOCUMENTS

CN    1828071 A    9/2006
DE    3228189 A1   1/1984

(Continued)

OTHER PUBLICATIONS

The International Search Report from parent International Application No. PCT/US2008/005921.

*Primary Examiner* — Flemming Saether
(74) *Attorney, Agent, or Firm* — Faegre Baker Daniels LLP

(57) ABSTRACT

A fastening element includes a holding part with a support plate and expanding cheeks, and a locking part guidingly received in the holding part. The expanding cheeks include cantilevered walls formed adjacent the support plate, which are offset radially outwardly with respect to a guide wall of the support plate which guides the locking part. The locking part can be pushed through the support plate substantially without force until it reaches inwardly protruding ramp projections formed on the expanding cheeks, which provide a better lever ratio for spreading the expanding cheeks.

6 Claims, 6 Drawing Sheets

(56) References Cited

U.S. PATENT DOCUMENTS

| | | | |
|---|---|---|---|
| 7,033,121 B2* | 4/2006 | Kirchen | 411/48 |
| 7,484,919 B2* | 2/2009 | Hansen | 411/45 |
| 7,553,116 B2* | 6/2009 | Lesecq | 411/45 |
| 2003/0039528 A1* | 2/2003 | Yoon | 411/45 |

FOREIGN PATENT DOCUMENTS

| | | | |
|---|---|---|---|
| DE | 3424075 C2 | 1/1986 |
| DE | 19816533 A1 | 10/1999 |
| GB | 1520155 A | 8/1978 |
| GB | 2057554 A | 4/1981 |
| JP | 61-167708 A | 7/1986 |
| JP | H11-303827 A | 11/1999 |
| JP | 2003-83313 A | 3/2003 |
| JP | 2007-187268 A | 7/2007 |
| WO | WO03/001074 A1 | 1/2003 |

* cited by examiner

FASTENING ELEMENT FOR CONNECTING A SUPPORT PART TO AN ADD-ON PART

CROSS-REFERENCE TO RELATED APPLICATION

This application is a U.S. National Phase Patent Application based on International Application Serial No. PCT/EP2008/005921 filed Jul. 18, 2008, the disclosure of which is hereby explicitly incorporated by reference herein.

BACKGROUND OF THE INVENTION

1. Field of the Invention

The invention is directed to a fastening element for connecting a support part to an add-on part.

2. Description of the Related Art

One fastening element is known from DE 34 24 075 C2. This fastening element for connecting a support part to an add-on part is provided with a holding part, which is to be inserted into a clamping opening in the support part and which comprises a support plate and, formed on the support plate, a number of expanding checks that are offset radially inwardly from the support plate. Each expanding cheek comprises a ramp projection that protrudes radially inwardly at a distance from the support plate. The fastening element of the species in question is further equipped with an elongated locking part that can be pushed, by a shaft portion, between the expanding cheeks into the holding part through a guide opening formed in the support plate with a guide wall so as to fit flush with the locking part. The locking part moves the expanding cheeks radially outward by running up onto the ramp projection, with the result that an add-on part disposed between the support part and the support plate is connected to the support plate by the clamping action.

Known from JP 61 167708 A is a fastening element for connecting a support part to an add-on part and comprising a holding part that is to be inserted in a clamping opening in the support part. The holding part has a support plate and, formed on the support plate, a number of expanding cheeks that are offset radially inwardly from the support plate. The expanding cheeks are provided with outer walls which in a relaxed arrangement rest on a cylinder surface, and each of which is provided at a distance from the support plate with a respective radially inwardly protruding ramp projection. This fastening element is also equipped with an elongated locking part, whose diameter in a region disposed forward of the ramp projections in the insertion direction is smaller than the interior spacing between the expanding cheeks, and which can therefore be inserted into the holding part with a certain play. When the locking part runs up onto the ramp projection, the expanding cheeks splay outward.

Known from DE 198 16 533 A1 is an inner liner panel comprising expanding cheeks that are to be inserted in a clamping opening of a thin metal inner door panel and whose outer walls rest on a cylindrical surface. Also present is an elongated locking part with a paddle-shaped end portion that has two different widthwise dimensions. Formed in an end portion of the expanding cheeks are ramp projections and a cavity whose diameter is approximately equal to the largest width of the paddle-shaped end portion of the locking part, with the result that when the expanding cheeks are relaxed, the locking part can be pushed in with relatively little insertion force and, in order to splay out the expanding cheeks, can be rotated into a final position in such a way that the larger width of the paddle-shaped end portion acts on the ramp projections.

SUMMARY OF THE INVENTION

The present invention provides a fastening element which, despite a relatively low insertion force, is distinguished by high clamping action and a high pull-out force even with relatively large tolerances in the dimensions of a clamping opening in a support part, even in the lower tolerance range.

By virtue of the fact that a cantilevered wall that is offset radially outwardly from the guide wall is formed on each expanding cheek between the guide opening and the ramp projection, the shaft portion, after passing through the guide opening, passes in between the expanding cheeks substantially without force even if the latter are flexed inward from their idle position owing to relative underdimensioning of the throughpass opening in the support part. As a result, even if the expanding cheeks are flexed—an occurrence that is not provided for per se—and, all the more so, should the holding part be disposed in a throughpass opening of a support part with substantially no interaction between these components, a foot end located in front in the insertion direction of the fastening part does not exert an effect on the expanding checks until it is a certain distance from the support plate, with the result that, owing to the then-favorable lever ratio, high clamping forces are induced with relatively low insertion forces.

In one form thereof, the present invention provides a tfastening element for connecting a support part to an add-on part, including a holding part that has a support plate and, formed onto the support plate, a number of expanding cheeks that are offset radially inwardly from the support plate, the expanding cheeks each being provided, at a distance from the support plate, with a respective radially inwardly protruding ramp projection and a respective outer wall that widens radially outwardly; and including an elongated locking part that can be pushed by a shaft portion between the expanding checks into the holding part through a guide opening configured in the support plate with a guide wall in a manner that provides a flush fit with the shaft portion, the locking part moving the expanding cheeks radially outwardly by running up onto the ramp projections, characterized in that configured on each expanding cheek, adjacent to the support plate, between the guide opening and the respective ramp projection, is a cantilevered wall that is offset radially outwardly from the guide wall of the guide opening.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
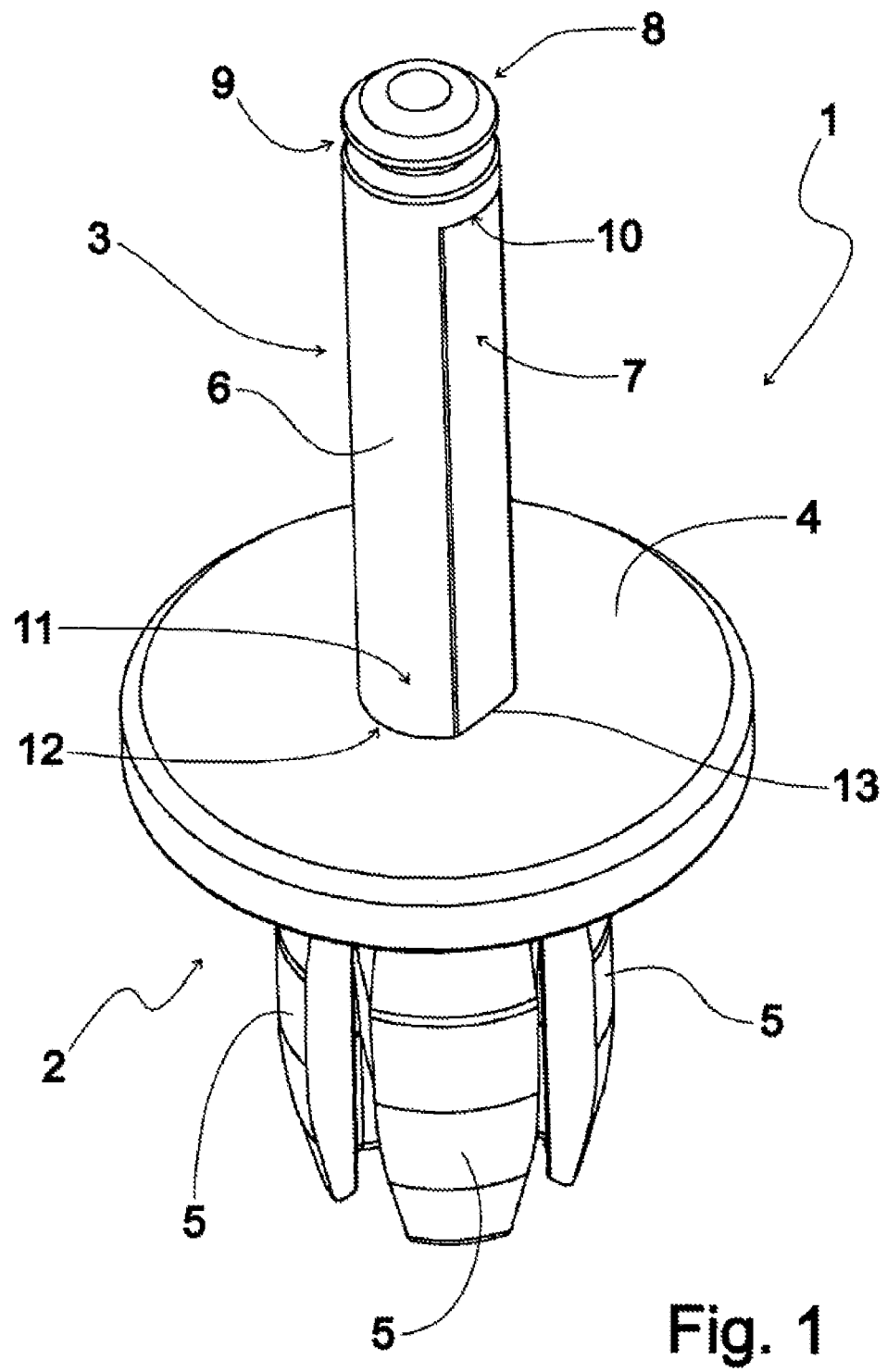
FIG. 1 is a perspective view of a first exemplary embodiment of a fastening element according to the invention, having a holding part and a locking part.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DETAILED DESCRIPTION

FIG. 1 is a perspective view of a first exemplary embodiment of fastening element 1 according to the invention, made of a hard elastic synthetic material and comprising a holding part 2 and an elongated locking part 3 that is displaceably seated in the holding part 2. The holding part 2 is provided with a flat, disk-like support plate 4, formed on one side of which are a number of expanding cheeks 5 disposed circumferentially about the locking part 3. The locking part 3 has a shaft portion 6, which is cylindrical except for a planar flattening 7 serving to secure it against rotation. The flattening 7 extends, with the formation of a stop step 10, from a head portion 8 configured with a circumferential annular groove 9 serving as a grasping aid to a foot portion 11, which is disposed oppositely from the head portion 8 and which in the arrangement according to FIG. 1 is inserted in a guide opening 12 formed in the support plate 4. The guide opening 12 is configured with a guide wall 13 that flushly surrounds the shaft portion 6, with the result that the locking part 3, guided substantially without play by the guide opening 12, can be pushed into the holding part 2 until support plate 4 butts against stop step 10 in the holding part 2.

Figure 2:
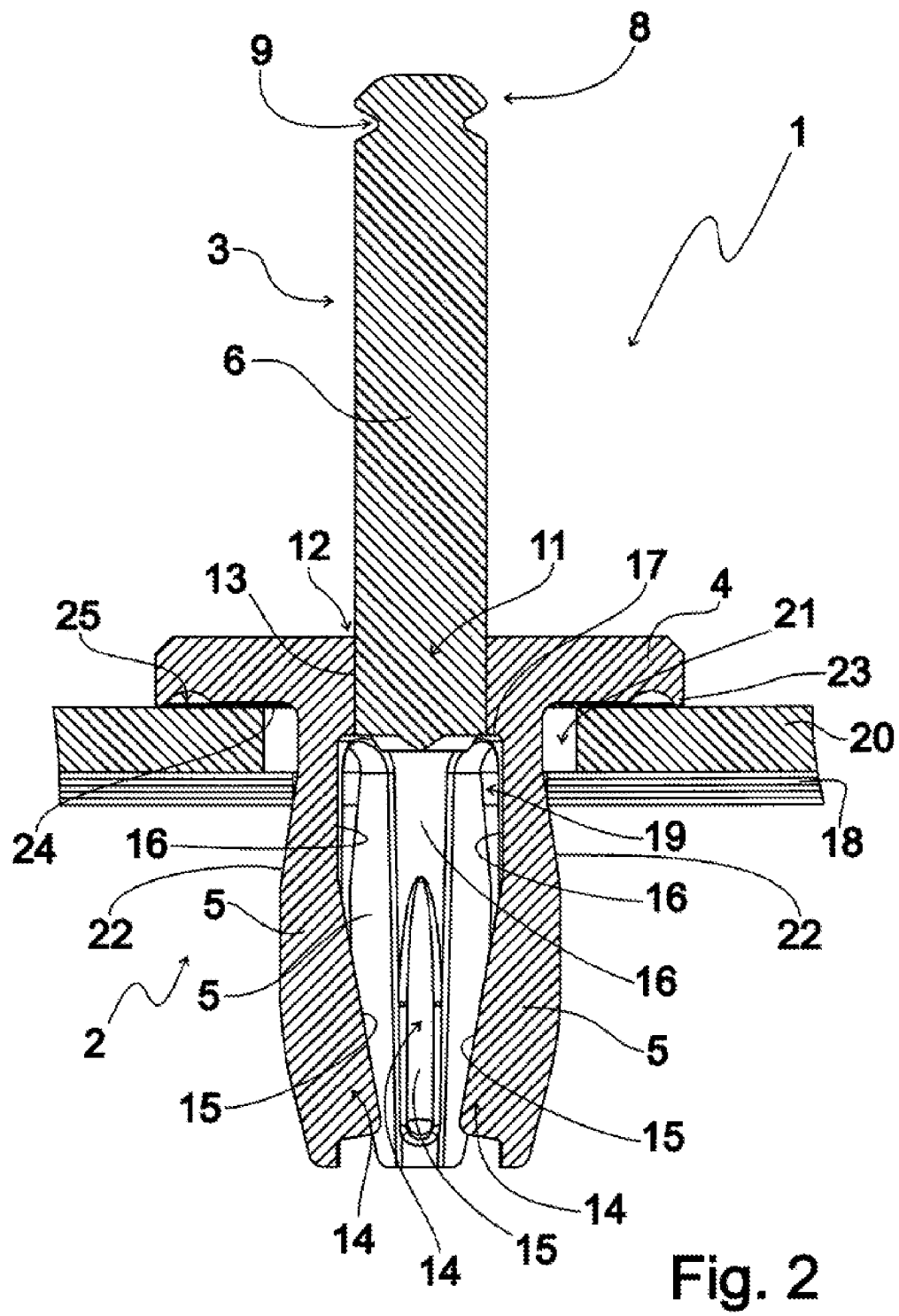
FIG. 2 is a sectional view of the exemplary embodiment according to FIG. 1 with the locking part in a pre-assembly position.

FIG. 2 is a sectional view of the exemplary embodiment according to FIG. 1 with the locking part 3 in an extended, pre-assembly position, in which the foot portion 11 is disposed in the guide opening 12. It is apparent from FIG. 2 that the expanding cheeks 5 are configured, at a distance from the support plate 4, with radially inwardly protruding ramp projections 14, each of which has, in the longitudinal direction of the fastening element 1, a ramp wall 15 that ascends shallowly radially inward from its end proximate the support plate 4 to the end remote from the support plate 4. It can also be seen from the representation according to FIG. 2 that configured on each expanding cheek 5, between the support plate 4 and the ramp projections 14, are a cantilevered wall 16, which is offset radially outwardly from the guide wall 13, and a circumferentially extending female wall 17, which is oriented substantially perpendicular to the guide wall 13 and extends from said guide wall 13 to the cantilevered walls 16.

In the representation according to FIG. 2, the fastening element 1 is inserted in a clamping opening 19 formed in a support part 18 and through a throughpass opening 21 provided in an add-on part 20, whereupon, in this arrangement, the support plate 4 bears against the add-on part 20, and the expanding cheeks 5, by virtue of having an outer wall 22 that widens radially outwardly beginning at a distance from the support plate 4 that is roughly equal to the thickness of the add-on part 20, is fixed against the support part 18 with a pre-assembly holding force that corresponds to the spring force with which the expanding cheeks 5 resist deflection.

It can further be seen from FIG. 2 that the support plate 4 has on the side facing toward the expanding cheeks 5 a radially outward, circumambient sealing lip 23, by virtue of the single-component construction of this exemplary embodiment as a hard-elastic sealing means, which protrudes in the axial direction slightly beyond a bottom wall 24 facing toward the expanding cheeks 5 and is bounded radially inwardly by a circumferential marginal groove 25 that is sunk in a circular-segment-like shape, to impart a certain deformability to the sealing lip 23.

Figure 3:
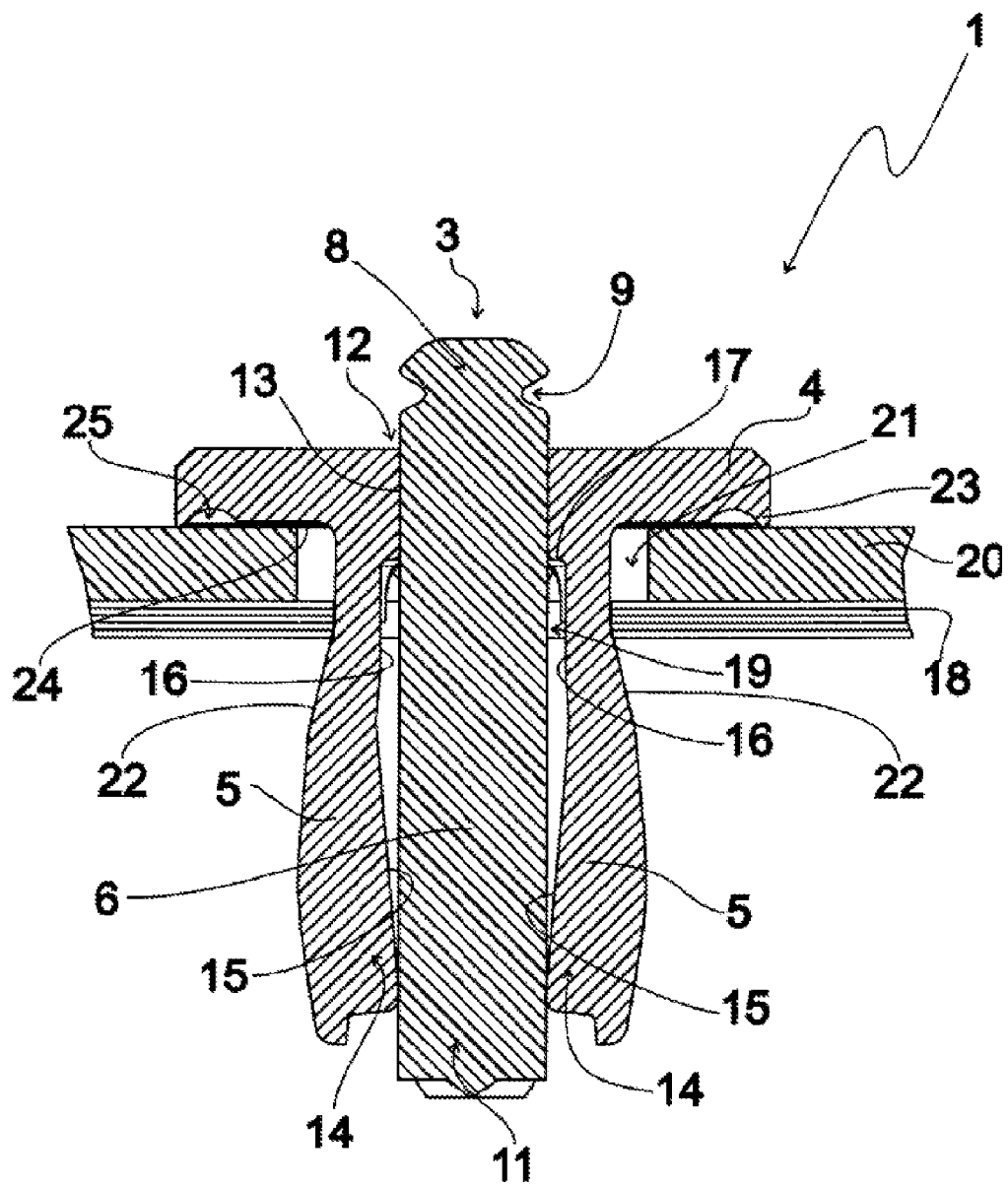
FIG. 3 is a sectional view of the exemplary embodiment according to FIG. 1 with the locking part in a final assembly position.

FIG. 3 shows the exemplary embodiment explained with reference to FIGS. 1 and 2 with the locking part 3 in a final assembly position in which it is pushed into the holding part 2. It is apparent from FIG. 3 that space exists in the radial direction between the head portion 8 of the locking part 3 and each cantilevered wall 16, with the result that only after a certain insertion movement of, for example, approximately one-third the length of the expanding cheeks 5 has been executed in the axial direction substantially without force, even when the expanding cheeks 5 are biased radially inward, for example due to a clamping opening 19 that is dimensioned in the lower tolerance range, does it transpire that the foot portion 11 comes into contact with the ramp walls 15 of the ramp projection 14 and the expanding cheeks 5 flare, thus clamping the holding part 2 in the clamping opening 19 of the support part 18. By virtue of the clamping action that occurs after the expanding cheeks 5 flare out in the radial direction, the fastening element 1 is stably anchored in the support part 18 with a high pull-out force, the sealing lip 23 resting with a slight bias flush against the add-on part 20 and thereby sealing the clamping opening 19 and the throughpass opening 21.

In addition, because the foot portion 11 acts on the ramp projection 14 at a relatively large distance from the support plate 4, a favorable lever ratio for spreading the expanding cheeks 5 is obtained, and is even preserved when the expanding checks 5 are flexed radially inwardly and are over-biased due to a too-small diameter of the clamping opening 19 compared to the nominal diameter.

To release the fastening element from engagement with the support part 18, the locking part 3 can be grasped, for example with two fingers or by means of a gripping tool, preferably in the region of the annular groove 9, and moved back out of the final assembly position shown in FIG. 3 into the pre-assembly position shown in FIG. 2, so that the fastening element 1 can again be removed from the support part 18.

Figure 4:
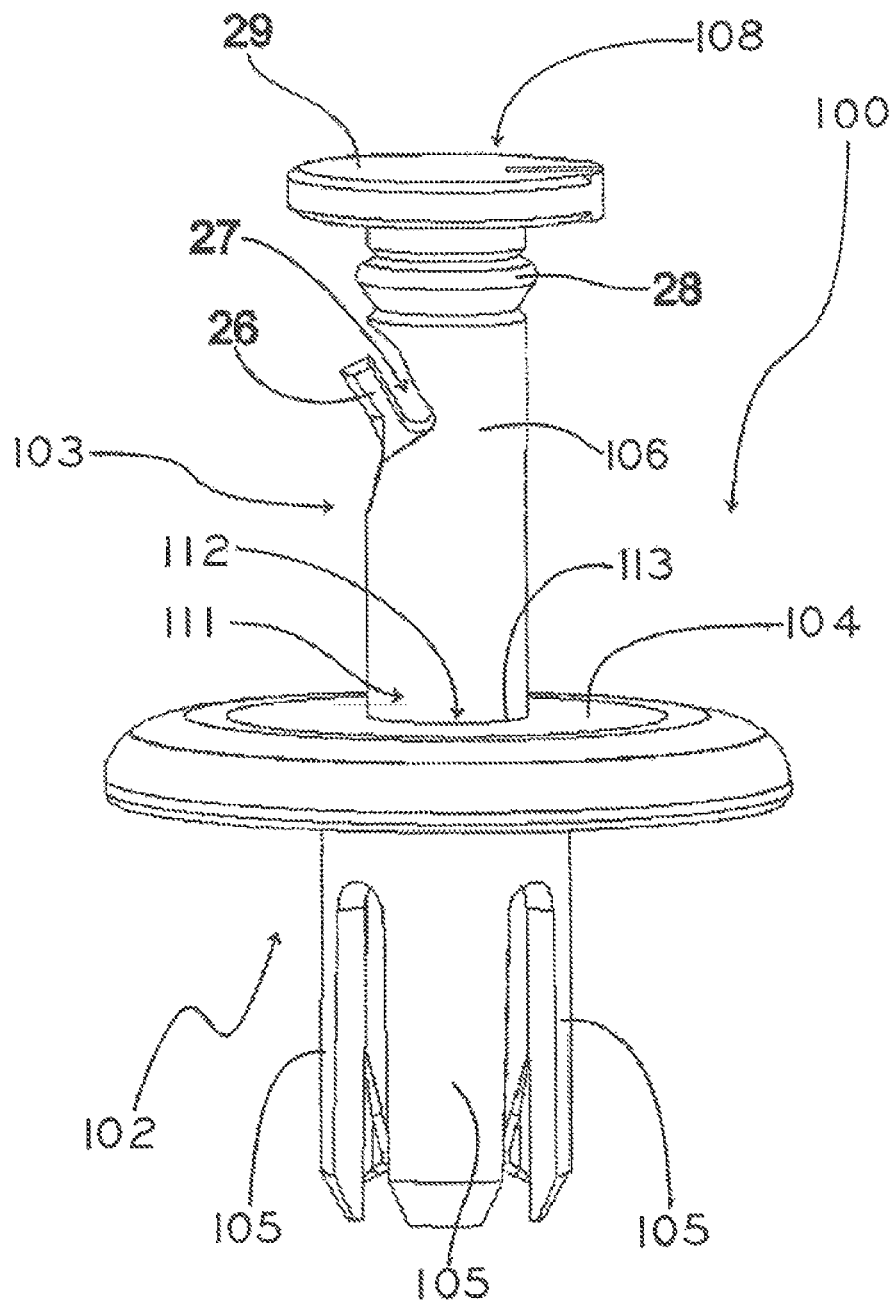
FIG. 4 is a perspective view of another exemplary embodiment of a fastening element according to the invention, comprising a holding part and a locking part that is provided with a latching means.

FIG. 4 is a perspective view of another exemplary embodiment of a fastening element 100 according to the invention, it being noted that like elements in FIGS. 1 to 3 and in FIG. 4 are provided with the same reference numerals and will not be described more closely below. It can be seen from FIG. 3 that in the second exemplary embodiment, formed as a latching means on the shaft portion 106 of the locking part 103 is an elastic latching tongue 26, which projects radially beyond shaft portion 106 and extends in the direction of head portion 108, and which is able to dip toward the shaft portion 106 into a clearance 27.

In the second exemplary embodiment according to FIG. 4, configured in the head portion 108 of the locking part 103 is a circumambient elastic head seal 28 made of soft elastic media, also projecting radially outwardly beyond the shaft portion 106. Finally, in the second exemplary embodiment the head portion 108 comprises, on the side facing away from the shaft portion 106, a head plate 29, which also projects radially outwardly beyond the shaft portion 106.

Figure 5:
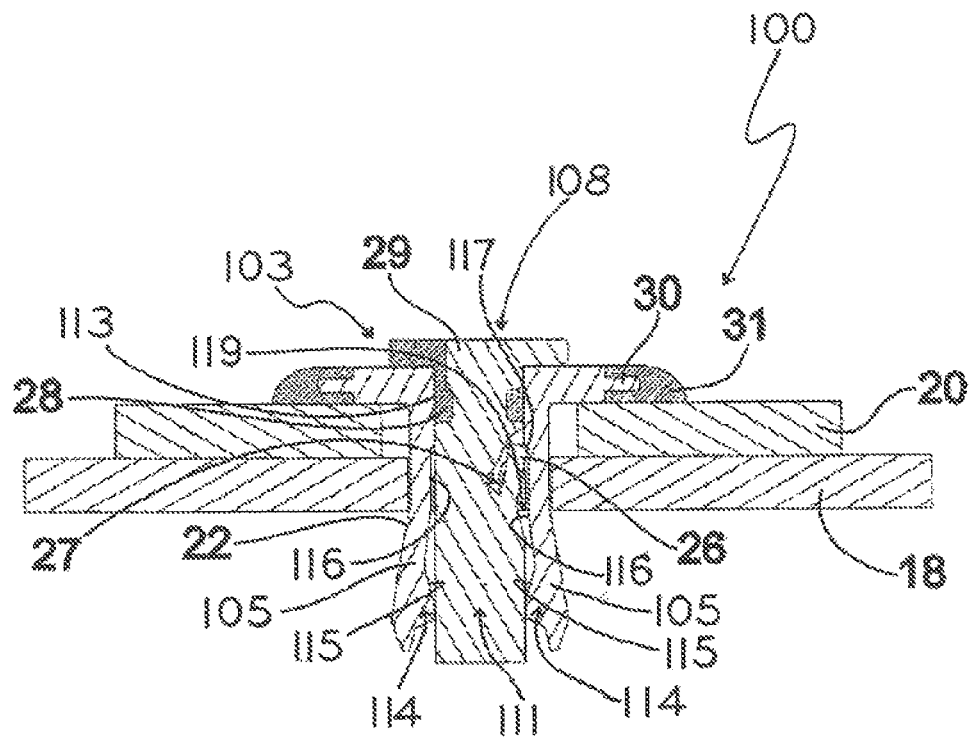
FIG. 5 is a sectional view of the exemplary embodiment according to FIG. 4 in a final assembly position of the locking part, in combination with a first embodiment of sealing elements.

FIG. 5 shows the second exemplary embodiment according to FIG. 4 after the locking part 103 has been shifted from the pre-assembly position shown in FIG. 4 into a final assembly position, in which, by suitable adaptation of the distance between the free end of the latching tongue 26 and the side of the head plate 29 facing toward the latching tongue 26, the latching tongue 26 rearwardly engages the female wall 117 and thereby locks the locking part 103 in the holding part 102 with a high pull-out force, until a the fastening element 100. In the final assembly position, the head seal 28 is compressed by contact with the guide wall 113 of the guide opening 112.

It can also be seen from FIG. 5 that in a first embodiment of the sealing means, formed onto a circumambient edge web 30 configured radially outwardly of the head plate 29 is an elastic collar lip 31 made of a soft component, which approximately matches the radial extent of the side of the support plate 4 facing toward the expanding cheeks 105. The collar lip 31 thus has a relatively large contact area with the add-on part 20, resulting in good sealing action.

Figure 6:
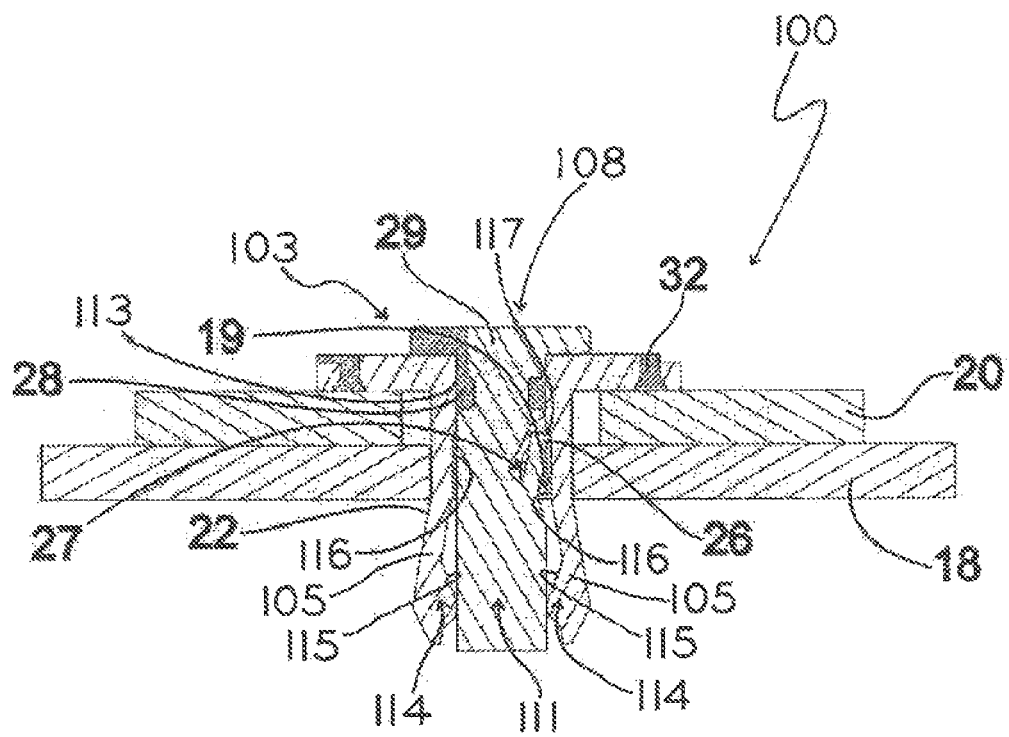
FIG. 6 is a sectional view of the exemplary embodiment according to FIG. 4 in a final assembly position of the locking part, in combination with a second embodiment of sealing elements.

FIG. 6 shows the second exemplary embodiment according to FIG. 4 and FIG. 5 with another embodiment of sealing means. In the embodiment according to FIG. 6, the sealing means comprise, in the radially outer edge region of the support plate 4, a bridging lip 32 made of a soft component, which is joined flush to a smooth outer edge wall of the support plate 4, and which brings about satisfactory sealing action with less material expenditure than in the case of the embodiment of FIG. 5.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A fastening element for connecting a support part to an add-on part, comprising:
   a holding part including a support plate having a guide opening and a plurality of expanding cheeks extending from said support plate, each of said expanding cheeks having a length, each expanding cheek including a radially inwardly protruding ramp projection and an outer wall that widens radially outwardly, said ramp projections extending from respective ends of said expanding cheeks along at least half of said respective lengths of said expanding cheeks, each said expanding cheek further including a cantilevered wall adjacent said support plate and disposed between said guide opening and said ramp projection, each said cantilevered wall offset radially outwardly from said guide opening, and at least one female wall extending between said guide opening and a said cantilevered wall, said female wall disposed substantially perpendicular to said cantilevered wall;
   an elongated locking part insertable through said guide opening in said support plate and between said expanding cheeks, said locking part including a head portion and a shaft portion having a flush fit within said guide opening, said locking part engageable with said expanding cheeks to move said expanding cheeks radially outwardly by running up onto said ramp projections of said expanding cheeks, said shaft portion further including an elastic latching tongue projecting radially outwardly of said shaft portion and extending toward said head portion, said elastic latching tongue deflectable into a clearance provided within said shaft portion and rearwardly engagable with said female wall in a final assembly position of said locking part;
   wherein said support plate includes at least one elastic seal bearing against the add-on part when said female wall is rearwardly engaged by said elastic latch in said final assembly position; and
   wherein said guide opening of said support plate and said shaft of said locking part are each cylindrical in shape, with said guide opening and said shaft each including respectively aligned flat surfaces which prevent rotation of said shaft within said guide opening.

2. The fastening element of claim 1, wherein each said cantilevered wall extends from said support plate to said ramp projections.

3. The fastening element of claim 1, wherein said locking part includes an annular groove disposed between said shaft portion and said head portion.

4. The fastening element of claim 1, wherein said shaft portion includes an elastic head seal projecting radially beyond said shaft portion, said hea seal compressively bearing against said guide wall in said final assembly position.

5. The fastening element of claim 1, wherein a portion of said elastic seal is disposed radially outwardly of said support plate.

6. The fastening element of claim 1, wherein said holding part includes at least three of said expanding cheeks spaced circumferentially about said holding part.

\* \* \* \* \*

UNITED STATES PATENT AND TRADEMARK OFFICE
CERTIFICATE OF CORRECTION

PATENT NO. : 9,011,058 B2  Page 1 of 1
APPLICATION NO. : 12/669367
DATED : April 21, 2015
INVENTOR(S) : Martin Busch It is certified that error appears in the above-identified patent and that said Letters Patent is hereby corrected as shown below:

In the Claims:

Claim 4, Column 6, line 40, please replace "hea" with -- head --.

Signed and Sealed this
Eleventh Day of August, 2015

Michelle K. Lee
*Director of the United States Patent and Trademark Office*